J. M. CUSTER.
STEERING WHEEL.
APPLICATION FILED FEB. 18, 1913.

1,129,852.

Patented Mar. 2, 1915.

2 SHEETS—SHEET 1.

Witnesses
L. B. James
C. E. Hunt

Inventor
J. M. Custer
By H. B. Willson & Co
Attorneys

J. M. CUSTER.
STEERING WHEEL.
APPLICATION FILED FEB. 18, 1913.

1,129,852.

Patented Mar. 2, 1915.
2 SHEETS—SHEET 2.

Witnesses
L. B. James
C. E. Hunt

Inventor
J. M. Custer
By H. B. Willson &co
Attorneys

UNITED STATES PATENT OFFICE.

JOSEPH M. CUSTER, OF COPPER HILL, VIRGINIA.

STEERING-WHEEL.

1,129,852.  Specification of Letters Patent.  Patented Mar. 2, 1915.

Application filed February 18, 1913. Serial No. 749,101.

*To all whom it may concern:*

Be it known that I, JOSEPH M. CUSTER, a citizen of the United States, residing at Copper Hill, in the county of Floyd and State of Virginia, have invented certain new and useful Improvements in Steering-Wheels; and I do declare the following to be a full, clear, and exact description of the invention, such as will enable others skilled in the art to which it appertains to make and use the same.

This invention relates to improvements in steering wheels for automobiles or other vehicles, ships and the like.

One object of the invention is to provide a steering wheel having means whereby the movable member thereof is automatically locked when its movement is stopped and which is automatically released when again moved, thereby holding the parts operated by the wheel in the positions to which they have been adjusted and permitting the operator to let go the wheel without danger of the vehicle deviating from its course.

With this and other objects in view, the invention consists of certain novel features of construction, and the combination and arrangement of parts as will be more fully described and claimed.

Figure 1:
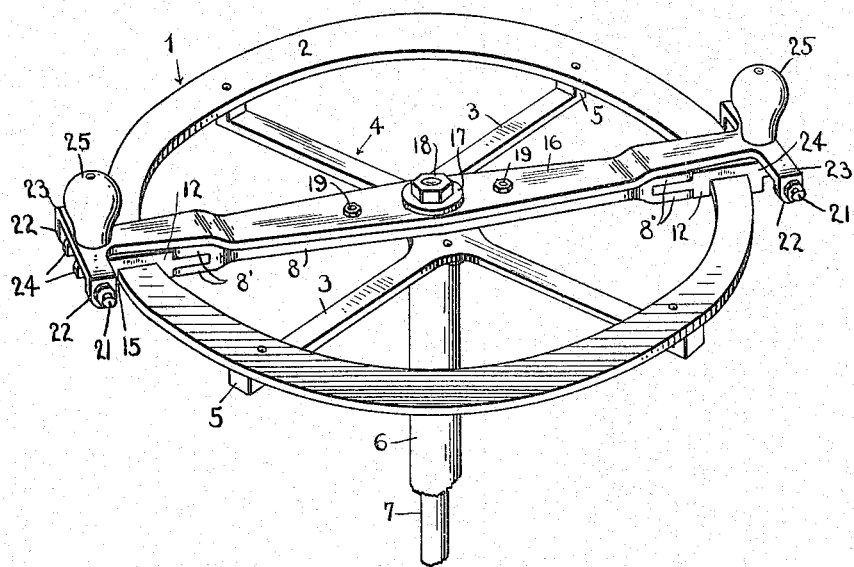
Figure 2:
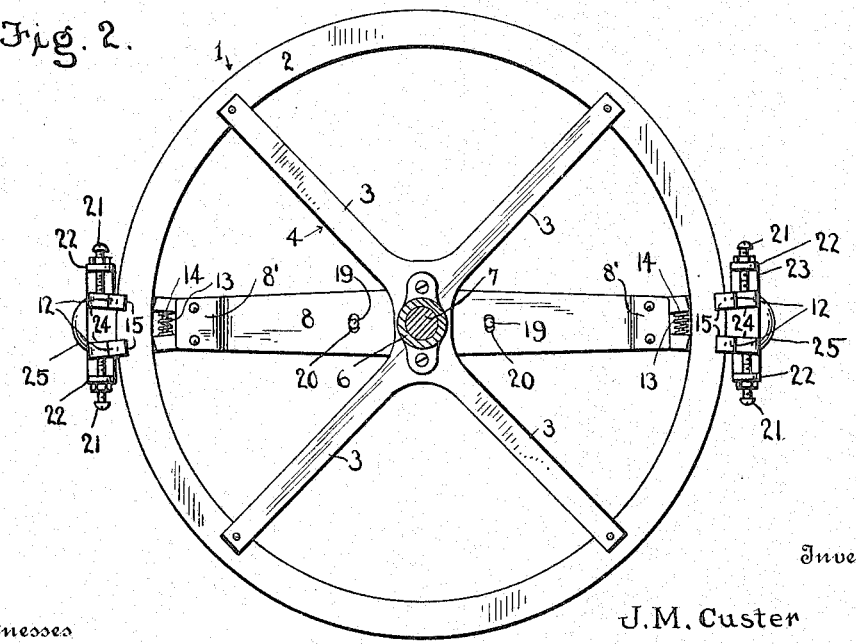
Figure 3:
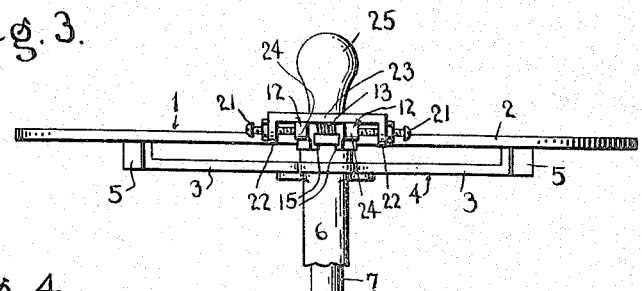
Figure 4:
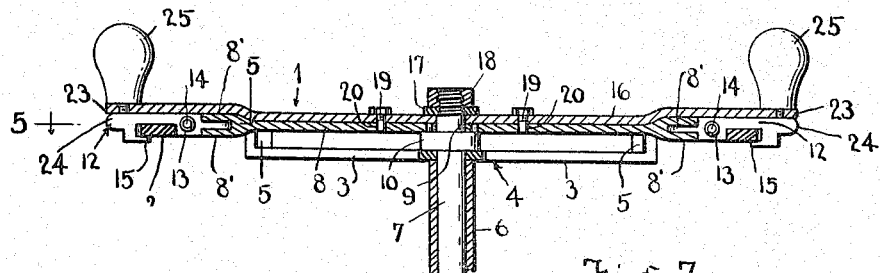
Figure 5:
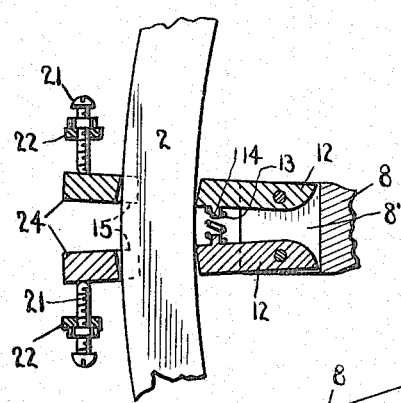
Figure 7:
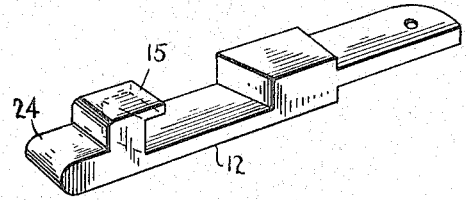
Figure 6:
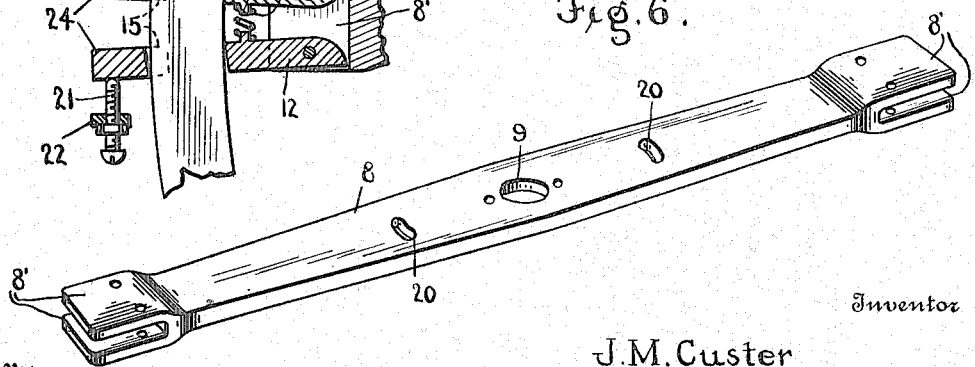

In the accompanying drawings; Figure 1 is a perspective view of my improved steering wheel showing the application thereof to the steering post of an automobile; Fig. 2 is a bottom plan view thereof; Fig. 3 is a side view looking at one end of the steering lever and the clutch member at this end of the latter; Fig. 4 is a central vertical section of the wheel and upper end of the steering post tube; Fig. 5 is an enlarged horizontal sectional view through a portion of the wheel taken on the line 5—5 of Fig. 4, and illustrating more particularly the arrangement and operation of the clutch fingers which lock the wheel in its adjusted position; Fig. 6 is a detail perspective view of the clutch bar of the wheel; Fig. 7 is a similar view of one of the clutch fingers carried by the clutch bar.

Referring more particularly to the drawings, 1 denotes the stationary member of my improved wheel, said member being in the form of an open circular frame 2 which is secured to the outer ends of the arms 3 of a supporting spider 4, said arms and spider being offset from or spaced a slight distance below the circular frame 2 by means of right angular offset lugs 5 formed on the ends of the arms 3 and to which the frame 2 is riveted or otherwise rigidly secured. The stationary member 1 is adapted to be rigidly secured in any suitable manner to the supporting device of the wheel or to any other fixed object, and in the present instance said stationary member is shown as being rigidly clamped to the upper end of the tube 6 of an automobile steering post 7 to which the movable members of the wheel are attached.

The movable members of the wheel comprises a transversely disposed clutch bar 8 having therein midway between its ends an aperture 9 through which the reduced upper end of the steering post 7 projects and which is rigidly secured to a flange 10 on the post 7 adjacent to the upper side of the spider 4 of the stationary member of the wheel. The ends of the clutch bar 8 have formed thereon pairs of parallel apertured bearing lugs 8′ between which are pivotally secured the inner ends of clutch fingers 12, two of which are preferably provided on each end of the clutch bar, said fingers being recessed on their under sides to receive the annular frame 2 of the stationary member of the wheel with which said fingers are engaged. The end walls of the recesses in the lower sides of the fingers 12 are formed on an arc corresponding to the curvature of the circular frame 2 and the recessed parts of the fingers are of slightly greater length than the width of the ring whereby said fingers are permitted to swing apart or to be shifted outwardly away from each other to a slight extent thereby engaging the inner corners of the inner ends of the recesses with the inner edge of the frame 2 and the outer corners of the outer ends of the recesses to the outer edge of the frame, said engaging corners forming a gripping engagement with the opposite edges of the frame when the fingers 12 are forced apart as clearly shown in Fig. 2 of the drawings. The fingers 12 are yieldingly and normally forced apart to bring the gripping corners thereof into engagement with the opposite edges of the frame by coiled springs 13 which are arranged between the inner portions of the fingers and have their ends engaged with studs 14 projecting from the inner sides of the fingers as shown. The fingers 12 are held in engagement with the frame 2 by guide lugs 15 which are formed on the lower sides of the fingers near their outer ends and project inwardly to a slight extent beneath the frame 2 as shown.

The other movable member of the wheel comprises a lever 16 which is pivotally engaged midway its ends with the reduced outer end of the upper post and rests on and is supported by the clutch bar 8. The lever 16 is held in pivotal engagement with the outer end of the steering post by a washer 17 and a retaining nut 18 which is screwed onto the reduced end of the post which is threaded to receive the same. The pivotal movement of the lever 16 on the reduced end of the steering post is limited by two studs 19 which are secured in the lever adjacent to and on opposite sides of its pivotal connection with the post and which project inwardly through elongated apertures 20 formed in the clutch bar 8. The engagement of the studs 19 with the apertures 20 in the clutch bar thus locks the lever to the bar, so that after the lever has been turned independently of the clutch bar to the limited movement permitted by the elongated apertures 20, said clutch bar will be moved by and with the lever when the movement of the latter is continued. The movement of the clutch bar 8 by the lever turns the steering post, to which as hereinbefore stated, the clutch bar is rigidly secured.

Before the clutch bar can be moved by the lever 16 it is necessary to release one or the other of the clutch fingers at each end of the clutch bar. This releasing of the clutch fingers is automatically accomplished by the slight initial independent movement of the lever on the clutch bar and by means of short clutch engaging screws 21 which have a threaded engagement with apertured inwardly or downwardly projecting ears 22 formed on the ends of cross heads 23 with which the opposite ends of the lever 16 are provided. The inner ends of the screws when thus arranged are adapted to engage reduced extensions 24 on the ends of the clutch fingers whereby when the lever 16 is first moved in either direction, one or the other of the screws at each end of the lever is brought into engagement with the end of the adjacent clutch finger, thereby moving the latter inwardly against the pressure of the springs 13 and disengaging the gripping corners of the recessed portion of these fingers from the opposite edges of the frame 2 thereby permitting the clutch bar and the steering post to which the latter is fixed to be turned by and with the lever for steering the vehicle. As soon as the lever is released by the operator, the springs 13 will immediately force the retracted clutch fingers outwardly and into gripping engagement with the frame 2 of the stationary member of the wheel thereby locking the clutch bar and lever to said frame or stationary member and thus holding the steering post rigid which will cause the vehicle to continue in the course in which it has been directed until the steering mechanism is again released and the steering post turned to change the direction. The steering lever 16 is provided on its outer ends with suitable handles or knobs 25 whereby the same may be readily engaged and moved by the operator in the manner described.

By means of a steering wheel constructed in accordance with my invention it will be seen that if for any reason, the operator should desire to release or let go the wheel the steering mechanism will be instantly locked in the position to which it was adjusted when the wheel was released, thus obviating any danger of the vehicle leaving its course.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

In a steering wheel, the combination with a steering post or the like, of a fixed annular member, a clutch bar fixed to said steering post and having on its ends apertured bearing lugs, clutch fingers pivotally mounted at their inner ends in said lugs and having therein segmental recesses adapted to receive said fixed annular member of the wheel, springs arranged between said clutch fingers whereby the latter are forced apart and the ends of the recesses therein brought into clutching engagement with the inner and outer edges of said fixed annular member of the wheel, an operating lever pivotally mounted on said post and having a loose connection with said clutch bar, cross heads on the ends of said lever, apertured lugs on said cross heads, screws arranged in said lugs and adapted to engage the outer sides of said clutch fingers whereby the latter are adjusted and the outward movement thereof by said springs is limited and whereby on the first initial movement of the lever in one direction or the other, one of said screws on each end of the lever will release the clutch finger engaged thereby from said fixed annular member of the wheel, thereby permitting the clutch bar and steering post to be turned by the further movement of the lever, and handles arranged on said lever whereby the latter may be conveniently actuated by the operator.

In testimony whereof I have hereunto set my hand in presence of two subscribing witnesses.

JOSEPH M. CUSTER.

Witnesses:
J. W. GRAY,
W. H. ROFF.

Copies of this patent may be obtained for five cents each, by addressing the "Commissioner of Patents, Washington, D. C."